United States Patent
Torrent

(10) Patent No.: US 10,605,499 B2
(45) Date of Patent: Mar. 31, 2020

(54) ENERGY SYSTEM WITH IMPROVED EFFICIENCY

(71) Applicant: DATATECHNIC INTERNATIONAL, Uxegney (FR)

(72) Inventor: Pierre-Yves Torrent, Epinal (FR)

(73) Assignee: DATATECHNIC INTERNATIONAL, Uxegney (FR)

(*) Notice: Subject to any disclaimer, the term of this patent is extended or adjusted under 35 U.S.C. 154(b) by 253 days.

(21) Appl. No.: 15/302,953

(22) PCT Filed: Apr. 11, 2014

(86) PCT No.: PCT/FR2014/050887
§ 371 (c)(1),
(2) Date: Oct. 7, 2016

(87) PCT Pub. No.: WO2015/155422
PCT Pub. Date: Oct. 15, 2015

(65) Prior Publication Data
US 2017/0038103 A1    Feb. 9, 2017

(51) Int. Cl.
| F25B 27/00 | (2006.01) |
| F25B 25/00 | (2006.01) |
| H02S 40/44 | (2014.01) |
| F24D 11/02 | (2006.01) |
| F24S 20/40 | (2018.01) |
| F24S 90/00 | (2018.01) |

(52) U.S. Cl.
CPC ........ *F25B 27/005* (2013.01); *F24D 11/0221* (2013.01); *F24S 20/40* (2018.05); *F24S 90/00* (2018.05); *F25B 25/005* (2013.01); *H02S 40/44* (2014.12); *Y02B 10/20* (2013.01); *Y02E 10/40* (2013.01)

(58) Field of Classification Search
CPC ....... F25B 27/005; F25B 25/005; F24S 90/00; F24D 11/0221; Y02B 30/125; Y02B 10/20; Y02B 10/70; Y02B 10/40; Y02B 10/60
See application file for complete search history.

(56) References Cited

U.S. PATENT DOCUMENTS 3,998,267 A * 12/1976 Faiczak ............... F24D 11/003
165/48.1
4,182,406 A *  1/1980 Holbrook ........... F24D 11/0221
165/48.2
(Continued)

FOREIGN PATENT DOCUMENTS

| CA | 116 036 A2 | 1/1982 |
| DE | 10 2009 004501 A1 | 9/2009 |
| FR | 2981202 A1 | 4/2013 |

*Primary Examiner* — David J Teitelbaum
(74) *Attorney, Agent, or Firm* — Craft Chu PLLC; Andrew W. Chu

(57) ABSTRACT

The energy system includes a heat exchanger absorbing heat energy from its environment, and a heat pump transferring energy from the heat exchanger to a heat-consuming circuit. The heat pump includes a regulator arranged so as to regulate a temperature of the heat exchanger at a temperature below a liquefaction and/or freezing temperature of the water vapor of the ambient air. The regulator is also arranged so as to regulate the temperature according to weather conditions, which the heat exchanger is exposed to, such as rain, wind, and sun.

15 Claims, 2 Drawing Sheets

(56) References Cited

U.S. PATENT DOCUMENTS 4,309,877 A * 1/1982 Tawse ................. F02G 5/00
                                                62/238.1
4,420,947 A * 12/1983 Yoshino ............ F24D 11/0264
                                                62/160
4,809,523 A * 3/1989 Vandenberg ....... F24D 11/0221
                                                62/483

* cited by examiner

ENERGY SYSTEM WITH IMPROVED EFFICIENCY

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to an energy system capable of sucking up the surrounding energy, an energy system of the type comprising namely a heat exchanger capable of absorbing heat energy from its environment and a heat pump capable of transferring heat energy from the heat exchanger to a heat-consuming circuit, for example a circuit comprising a water tank to be heated.

2. Description of Related Art Including Information Disclosed Under 37 CFR 1.97 and 37 CFR 1.98

The use of a heat pump to extract energy from the heat exchanger permits to cool the heat exchanger, but also to extract more energy from the heat exchanger, as described in a prior patent D1=FR 2981202 from the Applicant.

However, the efficiency of such an energy system can and should still be improved.

BRIEF SUMMARY OF THE INVENTION

In order to improve the efficiency of an energy system comprising a heat exchanger coupled to a heat pump (or HP), the invention provides to use a heat pump comprising a regulating means arranged so as to regulate a temperature of the heat exchanger to a temperature below a liquefaction and/or freezing temperature of water.

Thus, the vapor present in the ambient air liquefies or freezes and forms a liquid layer of water or ice on the heat exchanger. Water is a much better heat conductor than air, and the heat contained in water is much higher than the heat contained in air. Moreover, water phase changes, from liquid to ice, and especially from vapor to liquid, generate a significant phase-change energy. Thus, by lowering the temperature of the panel below the liquefaction and/or freezing temperature of water, it is possible to recover the energies from the two successive phase changes of water and to recover the heat energy of ambient air with a much better energy transfer to the heat exchanger, in addition to the energy from the solar radiation received on the heat exchanger.

Preferably, the regulating means is also arranged to punctually regulate the temperature of the heat exchanger to a temperature higher than a melting temperature of water, for a predefined time suitable for loosening the layer of ice present on the heat exchanger. Since the heat exchanger is usually in an inclined position, the layer of ice slides and evacuates naturally. Alternatively, the loosened layer of ice can be removed manually. The duration of the predetermined time depends namely on the temperature of the ambient air. The heat exchanger can thus be defrosted punctually if needed. This permits to prevent an excessive layer of ice from forming on the heat exchanger.

According to one embodiment, the system also comprises a photovoltaic panel (10) thermally coupled to the heat exchanger (31), the photovoltaic panel and the heat exchanger forming together a hybrid solar panel. The heat exchanger is preferably a flat exchanger, with a surface area substantially equal to the surface area of the photovoltaic panel and is preferably positioned under the photovoltaic panel and in close contact therewith for an optimal thermal coupling.

The heat pump (20) can in turn comprise an energy transfer segment (32) and a circulator (33); the heat exchanger (31), the transfer segment (32) and the circulator (33), associated in series, form together a power capturing circuit (30), in which the circulator drives a heat-transfer fluid.

A regulation of the fluid flow speed in the capturing circuit permits the regulation of the fluid temperature in the heat exchanger, and eventually also permits the regulation of the temperature of the photovoltaic panel coupled to it.

The capturing circuit may also comprise a limiting means arranged so as to limit a temperature of the heat-transfer fluid at an inlet of the transfer segment. When the HP is stopped, the fluid stagnates inside the heat exchanger, so that it accumulates a large amount of energy and its temperature rises to a temperature, which may be too high to be supported by the energy-transfer segment and the downstream components of the HP. When the HP starts operating, the fluid exiting the heat exchanger at a too high temperature could seriously damage the transfer segment and the downstream components of the HP. In particular, a too high temperature in the evaporator can cause an excessive fluid temperature at the inlet of the compressor located downstream and result into a pressure likely to damage or prematurely wear out the compressor. The limiting means of the invention permits to eliminate these risks, namely at the start of the HP.

The capturing circuit (30) may also comprise an reverting means (35) arranged so as to drive in movement the heat-transfer fluid inside the heat exchanger in a first direction or in a second direction of circulation depending on a nighttime or daytime state surrounding the heat exchanger. This permits to take into consideration significant changes in thermal radiation. For example, over a day: during the daytime phase, the heat exchanger receives heat from the solar radiation and from the ambient air located above the heat exchanger; conversely, during the nighttime phase, the heat exchanger receives no longer solar radiation, but receives heat radiated by the support (soil, roof, wall, etc.), which the heat exchanger is fixed to, which support has stored heat emanating from the solar radiation received during the daytime phase. The reverting means according to the invention permits to best take into consideration this phenomenon. Of course, the notions of daytime/nighttime are relative and depend on the ambient weather conditions. Thus, for example, a particularly cloudy day can be regarded as a nighttime phase.

In the energy system according to the invention, the heat pump also comprises a transfer circuit (40) comprising, associated in series:
- a main segment for receiving (41) heat energy, thermally coupled to the transfer segment (32) for receiving heat energy from the capturing circuit, the main receiving segment (41) and the transfer segment (32) forming together a main evaporator of the heat,
- a compressor (42) for compressing the fluid exiting the main receiving segment (41) and transferring the compressed fluid to a main transfer segment (43) of the transfer circuit,
- a main expansion valve (47) for expanding the fluid exiting the main transfer segment (43) and transferring the expanded fluid to the main receiving segment (41).

The transfer circuit may also comprise a steam-injection means arranged so as to vaporize a part of the heat-transfer fluid exiting the main transfer segment (43) from a residual energy of a second part of the heat-transfer fluid exiting the main transfer segment (43) of the transfer circuit (40), and supply the vaporized fluid to a steam-injection inlet of the compressor.

The injection of steam into the compressor increases the coefficient of performance of the compressor. Indeed, the injection of steam increases the thermal power by 20 to 30% on average at the inlet of the main transfer segment (part of the condenser of the HP) and also increases the (electric) power absorbed by the compressor by 10% to 20%. Since the percentage of additional power of the condenser is larger than that of the compressor, the coefficient of performance (condenser power/compressor power) is increased.

According to one embodiment, the steam-injection means may comprise:
- a secondary segment for receiving (45) heat energy, arranged between the main transfer segment (43) and the main expansion valve (44) for receiving heat energy from the transfer segment of the capturing circuit,
- a secondary expansion valve for expanding the fluid exiting the main transfer segment (43) and transferring the expanded fluid to a secondary transfer segment (46) thermally coupled to the secondary receiving segment (44), a fluid outlet of the secondary transfer segment (46) being connected to the injection of the inlet compressor (42), the secondary receiving segment (45) and the secondary transfer segment (46) forming together a secondary evaporator of the heat pump.

This embodiment permits to carry out the steam injection without supplying additional energy.

According to yet an embodiment, the compressor (42) is a varying rotation speed compressor and wherein the regulating means is arranged so as to regulate a rotation speed depending on the temperature of the fluid flowing in the heat exchanger and/or an energy demand of the heat-consuming circuit located downstream.

In one example, the heat-distribution circuit (50) with heat-transfer fluid may comprise, connected in series:
- a receiving segment (51) thermally coupled to the main transfer segment (43) for receiving heat energy from the transfer circuit (40), the receiving segment (51) of the distribution circuit and the transfer segment of the transfer circuit forming together a condenser of the heat pump, and
- at least one heat-energy consumer (52, 53, 54).

Thus, the heat pump supplies a heat-energy consumer, for example a heating floor, a domestic hot water tank, etc.

Finally, the energy system according to the invention can be complemented with a circuit for producing power from heat-transfer fluid, which production circuit comprises, connected in series:
- a receiving segment arranged so as to receive heat energy from the main transfer segment (43) of the transfer circuit (40), the receiving segment of the production circuit and the transfer segment of the transfer circuit forming together a second condenser of the heat pump, and
- a turbine arranged so as to produce electrical energy from a fluid flowing in the receiving segment of the production circuit.

Thus, the heat pump supplies, in parallel with the heat-energy consumer, a turbine for producing electricity.

Thus complemented, the system according to the invention permits to recover a maximum of the heat energy available around the heat exchanger, and to best optimize the efficiency of the heat pump.

BRIEF DESCRIPTION OF THE SEVERAL VIEWS OF THE DRAWINGS

The invention will be better understood, and further features and advantages of the invention will become clear from the following description of exemplary embodiments of an energy system according to the invention. These examples are given in a non-restrictive way. The description should be read in conjunction with the attached drawings.

DETAILED DESCRIPTION OF THE INVENTION

As said above, the invention relates to an energy system capable of sucking up the surrounding heat energies. The energy system comprises a heat exchanger 31 and a heat pump or means for transferring 20 arranged so as to transfer the energy absorbed by the heat exchanger to a heat-consuming circuit, for example a hot-water tank 52, 54, a heating floor 53 or more generally any other heat-energy consumer.

Figure 1:
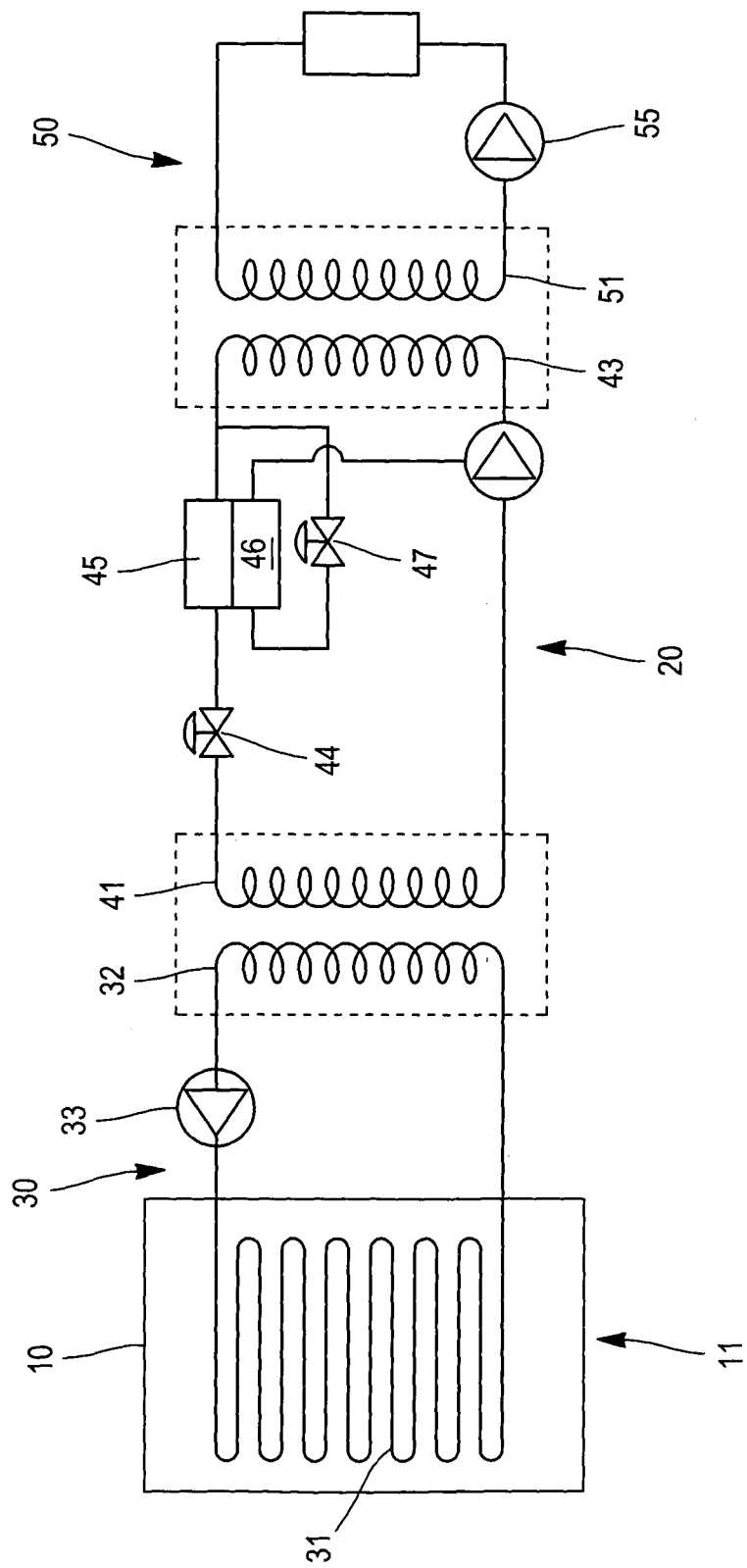
FIG. 1 is a schematic view of a block diagram of an energy system according to the invention.
Figure 2:
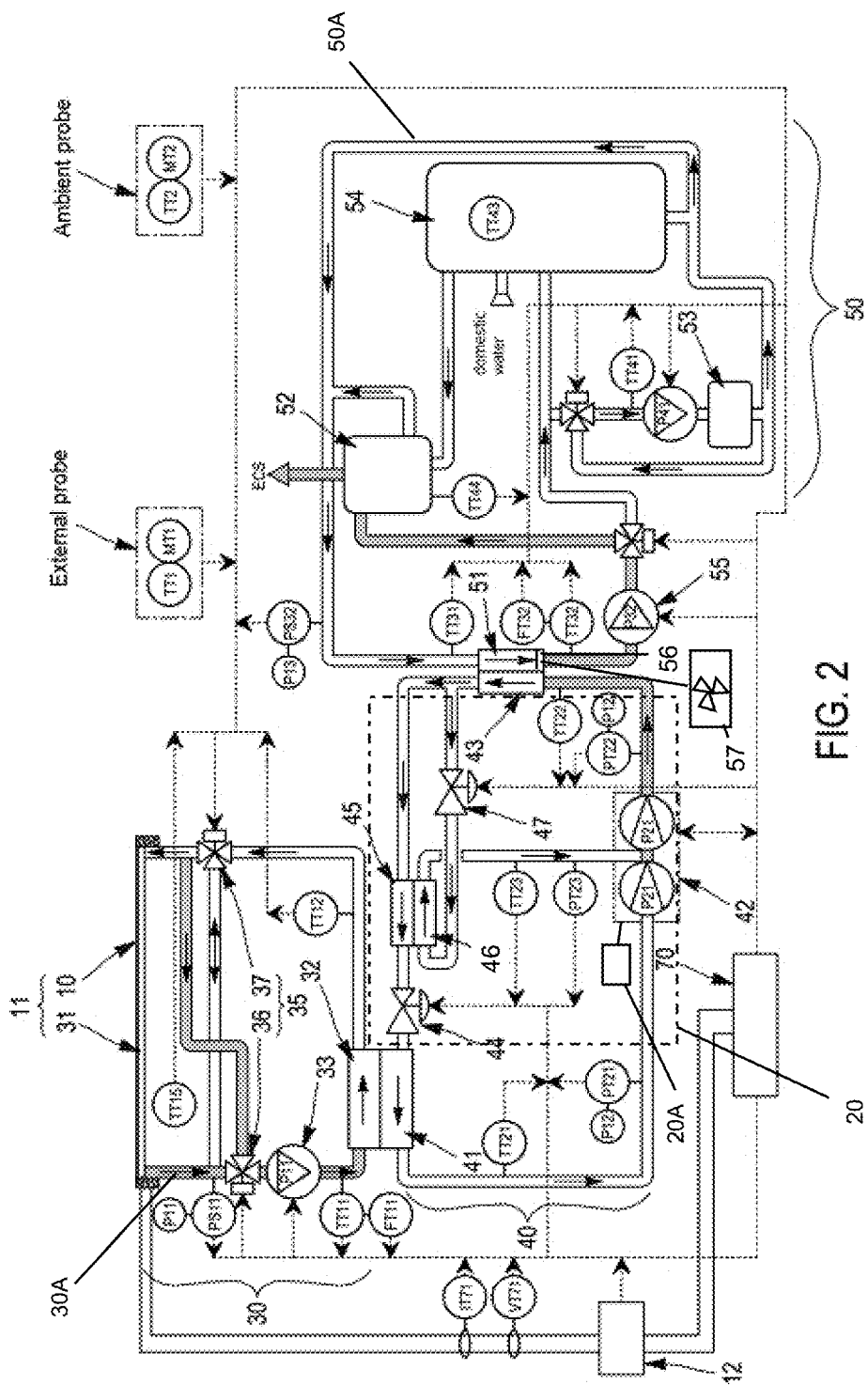
FIG. 2 is a schematic view of a detailed diagram of a system according to the invention.

In the example shown in FIGS. 1, 2, the heat exchanger is thermally coupled to a photovoltaic panel, used as a matter of fact in a known manner to produce electrical energy. The heat exchanger 31 is preferably a flat exchanger, with dimensions substantially equal to the dimensions of the photovoltaic panel; it is for example glued to a bottom face of the photovoltaic panel 10 and is thus an integral part of a hybrid panel; this in order to ensure a perfect physical and thermal contact and to ensure the mechanical maintaining of the two parts. Preferably, the bottom face of the photovoltaic panel is of a dark color, for example a black color (heat emissivity close to 1) in order to absorb a maximum solar heat radiation and thus to transmit a maximum of heat energy to the exchanger 31. In this embodiment, the energy system according to the invention can suck up the heat energy stored by the photovoltaic panel, in addition to the heat energy the heat exchanger could capture on its own, in the absence of a photovoltaic panel.

In another, less efficient embodiment, the heat exchanger is a solar thermal panel that is indeed known.

The system according to the invention is characterized in that the heat pump 20 comprises a regulator 20A or regulating means arranged so as to regulate a temperature of the heat exchanger 31 at a temperature below a liquefaction and/or freezing temperature of water, so as to form a layer of water or ice on the heat exchanger and/or on the hybrid panel. The temperature difference between the heat exchanger and the ambient air results into a thermal power recovered by the heat pump.

During the cooling of the heat exchanger 31 below the liquefaction temperature of the water vapor contained in the ambient air, the heat pump sucks up latent energy, which is particularly important, from the phase change water vapor/liquid water. As an indication, the latent heat from the liquefaction of water is 2257 kJ/kg. In other words, the energy released by the phase change at constant temperature is equivalent to cooling the liquid water by 539° C. Thus, the energy recovered during the phase change is at least 25 times higher than the one that can be recovered by regulating the temperature of the heat exchanger 20° C. below the ambient temperature.

During precipitations, the ambient temperature is equal to the liquefaction temperature of the water vapor; the heat exchanger 31 is capable of recovering the heat energy contained in rainwater: this energy is much higher than the one recovered from the ambient air, since the physical and thermodynamic properties (bulk density, specific heat at constant pressure, thermal conductivity) of water are much higher than those of air.

Preferably, the heat exchanger is cooled below the freezing temperature (0° C.), in order to suck up in addition the latent heat of the second phase change liquid water/ice. The liquid-solid phase change (referred to as solidification) of water releases an energy of 333 kJ/kg, i.e. equivalent to a cooling of liquid water by 79.6° C. The heat exchanger can thus recover the energies released by the two phase changes.

When the outdoor temperature is negative, the water vapor contained in the air is directly solidified on the heat exchanger or the hybrid panel (phase change referred to as condensation, liquefaction temperature=freezing temperature), the energy released is then 2257+333=2590 kJ/kg.

Another advantage of a phase change is the stability of the temperature in the heat exchanger for the whole duration of the phase change; this results into a stability of the coefficient of performance of the heat pump, which is particularly interesting.

Thus, in practice, when the outdoor temperature is high, for example in summer, the temperature of the heat exchanger can be regulated at a liquefaction temperature of water, which is varying depending on the weather conditions. When the outdoor temperature is low, for example in winter, the temperature of the heat exchanger can be regulated at the freezing temperature, in order to benefit from the heat energy released by the two phase changes.

When the temperature of the heat exchanger 31 is regulated at the freezing point or below, a layer of ice forms on both faces of the hybrid solar panel (11) (or on both faces of the heat exchanger 31 when there is no photovoltaic panel). Therefore, in the example implemented, the regulating means is also arranged so as to punctually regulate the temperature of the hybrid panel at a temperature higher than a melting temperature of water for a defined time for loosening the layer of ice present on the hybrid solar panel. Loosening the ice from the exchanger 31 is enough to evacuate all the ice deposited on the exchanger. In order to loosen the ice being formed, it is enough to melt an ice thickness of less than 1 mm, providing an energy of 333 kJ/kg of ice needed for the phase change: the energy "lost" for the defrosting (solid-liquid phase change) is very small in comparison with that previously recovered (vapor-liquid or vapor-solid phase change).

The heat pump 20 shown comprises an energy-transfer section 32 and a circulator 33; the heat exchanger 31, the transfer section 32 and the circulator 33, associated in series, form together a power capturing or an energy-capturing circuit (30), in which the pump drives a power capturing heat-transfer fluid (30A).

The capturing circuit 30 shown also comprises (FIG. 2):
a first three-way valve 36 a first inlet E1 of which is connected to a first end of the heat exchanger 31, a second inlet E2 of which is connected to a second end of the heat exchanger 31 and an outlet S of which is connected to an inlet of the transfer segment 32 of the capturing circuit 30, and
a second three-way valve 37 an inlet E of which is connected to an outlet of the transfer segment 32 of the capturing circuit 30, a first outlet S1 of which is connected to the first end of the exchanger 31 and a second outlet S2 of which is connected to the second end of the exchanger 31.

In the system according to the invention is also provided a driving means arranged so as to limit the temperature at the inlet of the transfer segment 32 by:
opening the first outlet S1 of the second valve 37,
closing the second outlet S2 of the second valve 37,
the second inlet E2 of the first valve 36 being kept closed.

The valve 36 and the associated driving means described above form together a limiting means arranged so as to limit a temperature of the heat-transfer fluid at an inlet of the transfer segment.

Limiting the temperature at the inlet of the transfer segment 32 permits to limit the temperature, and especially the pressure, of the fluid entering into the compressor downstream of the capturing circuit. The driving means regulates the opening and closing of the two outlets of the valve (37) so that:
a first part of the heat-transfer fluid (cooled by the heat pump) coming from the outlet of the transfer segment 32 is sent to the first end of the heat exchanger (31) by the first outlet S1 of the valve (37),
a second part of the heat-transfer fluid coming from the outlet of the transfer segment 32 is connected to the second end of the heat exchanger 31,
the fluid exiting the heat exchanger is then mixed with and cooled by the one coming from the outlet S1 of the valve 37 and the cooled fluid is sent to the transfer segment 32.

The temperature is limited at the inlet of the transfer segment to a value such that the temperature and the pressure at the inlet of the compressor located downstream are below the maximum admissible values at the inlet of the compressor. For example, the temperature is limited at the inlet of the transfer segment to a value of approximately +20° C. so that the temperature and the pressure at the inlet of the compressor located downstream are below maximum admissible values, about +20° C. and 17 bar, at the inlet of the compressor.

The driving means is activated namely to limit the temperature in the transfer segment 32 at the start of the HP and the circulation of the fluid inside the capturing circuit; this in order to limit the temperature of the fluid exiting the heat exchanger 31 after having stagnated for a period of time in the exchanger. Thus, at the start, in the valve 37 the outlet S1 is open and the outlet S2 is closed so that the heat exchanger is bypassed. Then, the driving means gradually closes the outlet S1 and gradually opens the outlet S2 until the fluid flowing in the exchanger 31 reaches a constant or nearly-constant nominal value (stabilized operation).

The driving means can also be activated to limit the temperature in the transfer segment 32 when the temperature stabilizes at too high a nominal value due to particular weather conditions. This is the case for example during the daytime phase, when:
- the outdoor temperature is moderate or high (above 15-20° C.) and the sunshine is strong
- the outdoor temperature is high (above 25-30° C.) and the sun is week.

With such weather conditions, the heat energy coming from the solar thermal radiation the hybrid solar panel (11) receives raises the temperature of the latter and that of the heat-transfer fluid of the capturing circuit (30) to a temperature much higher than that of the surrounding ambient air. In this case, the driving means maintains the outlet S1 partially open and the outlet S2 partially closed, so that:
- the temperature of the fluid flowing in the capturing circuit is maximal in order to greatly improve the coefficient of performance of the HP,
- the temperature of the fluid flowing in the capturing circuit is limited to its maximum admissible value.

In the system according to the invention is also provided a driving means arranged so as to reverse the flow of fluid in the heat exchanger 31:
- by opening the first inlet E1 and by closing the second inlet E2 of the first valve 36 and by closing the first outlet S1 and by opening the second outlet S2 of the second valve 37, or
- by closing the first inlet E1 and by opening the second inlet E2 of the first valve 36 and by opening the first outlet S1 and by closing the second outlet S2 of the second valve 37.

The two valves 36, 37 and the associated driving means described above form a reversing means 35 arranged to drive in movement the heat-transfer fluid inside the heat exchanger in a first direction or a second direction of flowing depending on a nighttime or daytime state surrounding the heat exchanger. The daytime/nighttime state can be defined depending on the ambient brightness compared to a reference value. Or, namely in the case of a system as shown using a hybrid panel, depending on an intensity of the electric current produced by the photovoltaic panel with respect to a reference value.

The heat pump also comprises a transfer circuit 40 comprising, connected in series:
- a main segment 41 for receiving heat energy, thermally coupled to the heat transfer segment 32 in order to receive heat energy from the capturing circuit; the main receiving segment 41 and the transfer segment 32 form together a main evaporator of the heat pump,
- a compressor 42 for compressing the fluid exiting the main receiving segment 41 and transferring the compressed fluid to a main transfer segment 43 of the transfer circuit,
- a main expansion valve 44 for expanding the fluid exiting the main transfer segment 43 and transferring the expanded fluid to the main receiving segment 41.

The function of the main expansion valve (or pressure-reducing valve) 44 is to expand and cool the heat-transfer fluid before the transfer to the evaporator, more specifically to the main receiving segment 41 of the evaporator.

Within the framework of the invention, the transfer circuit 40 also comprises a steam-injection means arranged so as to vaporize a part of the heat-transfer fluid exiting the main transfer segment 43 from a residual energy of a second part of the heat-transfer fluid exiting the main segment transfer 43 of the transfer circuit 40, and provide the vaporized fluid at a steam-injection inlet of the compressor.

The compressor 42 of the heat pump is an intermediate steam-injection compressor; it has two inlets and one outlet. The first low-pressure inlet is connected to the main evaporator, and more specifically to an outlet of the main receiving segment 41. The second medium-pressure inlet is connected to the compressor, and more specifically to an outlet of the main transfer segment 43, approximately between one half and two-thirds of the stroke of the compressor. This second inlet, referred to as steam-injection port, will be used to improve the coefficient of performance of the system, in particular when the absolute pressure ratio between the evaporator and the condenser, and/or the energy requirements of the user exceed preprogrammed thresholds.

The function of the steam-injection means is to improve the efficiency of the system (COP, coefficient of performance), namely when the temperature difference between the main evaporator (segment 41) and the condenser (segment 43) becomes higher than a predefined value, usually 40° C.

In the embodiment shown in FIG. 2, the steam-injection means comprises:
- a secondary segment for receiving 45 heat energy, arranged between the main transfer segment 43 and the main expansion valve 44 for receiving heat energy from the transfer segment of the capturing circuit,
- a secondary expansion valve 47 for expanding the fluid exiting the main transfer segment 43 and transferring the expanded fluid to a secondary transfer segment 46 thermally coupled to the secondary receiving segment 45, a fluid outlet of the secondary transfer segment 46 being connected to the injection inlet of the compressor 42, the secondary receiving segment 45 and the secondary transfer segment 46 forming together a secondary evaporator of the heat pump.

The receiving segment 45 and the transfer section 46 are positioned as close as possible to each other and such that the flow direction of the fluid within the transfer segment 46 is opposite the flow direction of the fluid inside the receiving section 45; they thus form together an optimized efficiency secondary evaporator.

The refrigerant fluid exiting the secondary expansion valve 47 (in the two-phase state, i.e. liquid+vapor) passes through the secondary evaporator 45, 46, in which it is heated (passing from the two-phase state to superheated vapor) by the fluid coming from the main transfer section 43 of the condenser, then it is injected into the compressor 42 through its steam-injection port.

The compressor 42 is a varying-speed compressor and the regulating means is arranged so as to regulate a rotation speed of the compressor (and thus the variation of the volume of fluid displaced in the compressor) depending on the temperature of fluid circulating in the heat exchanger and/or an energy demand by the heat-consuming circuit located downstream.

The system represented in FIG. 2 also comprises a power consumption circuit or heat-consuming circuit, of the heat-distribution type 50. The power consumption circuit or heat-distribution circuit 50 with a power consumption heat-transfer fluid 50A comprises, connected in series:

- a receiving section 51 arranged so as to receive heat energy from the main transfer segment 43 of the transfer circuit 40, the receiving segment of the distribution circuit and the transfer segment of the transfer circuit forming together a condenser of the heat pump, and
- three heat-energy consumers: a hot domestic-water tank ECS 52, a heating floor 53 and a hot heating-water tank ECC 54.

The system may also comprise a power-production circuit 57 comprising a power production fluid and a turbine, connected in series:

- an additional receiving segment 56 arranged so as to receive heat energy from the main transfer segment 43 of the transfer circuit 40, the additional receiving segment of the production circuit 57 and the main transfer segment 43 of the transfer circuit forming together a second condenser of the heat pump, and
- a turbine arranged so as to produce electrical energy from a fluid flowing in the receiving segment of the production circuit.

The system illustrated here also includes a photovoltaic inverter 12 for converting the direct current produced by the photovoltaic panel 10 into a single- or three-phase alternating current, depending on the electrical power being produced.

It should be noted that the sucking up of heat energy from the heat-exchanger 31 causes the cooling of the photovoltaic cells of the photovoltaic panel 10; this permits to increase the efficiency of the cells and thus to increase the photovoltaic power being produced by about 0.40%/° C. beyond a cell temperature of 25° C.

Also, the electricity produced by the photovoltaic panel 10 and converted by the photovoltaic inverter permits to supply all or part of the elements of the energy system according to the invention: circulators 33, 55, means for controlling the valves 36, 37, 44, 47, compressor 42, control device 70, etc. In case of a surplus of production (photovoltaic power higher than the power consumed by the elements of the energy system), the electricity can be consumed for domestic use (lighting, home appliances, etc.) and/or injected into the public distribution network and/or stored in an accumulator battery.

The system also comprises:

- a plurality of temperature sensors TT, arranged so as to measure the temperature outside the system, the temperature of the fluids at different spots of the capturing circuit, the transfer circuit and the heat-consuming circuit,
- a humidity probe MT, arranged so as to measure a humidity of the outside air, which the hybrid solar panel is exposed to,
- a light-intensity sensor arranged so as to measure the light intensity near the hybrid panel, and to derive a daytime/nighttime condition; alternatively, the daytime/nighttime state is derived from the intensity of the current produced by the photovoltaic panel, which intensity is measured by an ammeter IT,
- a plurality of pressure sensors PT, arranged so as to measure a pressure of the fluid flowing at the inlet and the outlet of the compressor 42,
- a device for controlling 70 the whole system.

The device 70 groups all the means for regulating and all the means for driving all the components (compressor, circulators, expansion valves, etc.) of the energy system depending on the weather parameters being measured (temperature, hygrometry, light intensity, etc.), and namely:

- the means for controlling the opening and closing of the valves 36, 37 of the capturing circuit,
- the control means of the circulator 33 of the capturing circuit,
- the control means of the main expansion valve 44 and the control means of the secondary expansion valve 47,
- the control means of the compressor 42 of the transfer circuit,
- and the means for regulating the temperature of the heat exchanger 31, which regulating means acts on all the control means of the components of the system described above, for regulating the temperature of the heat exchanger 31 at a value lower than the liquefaction temperature and/or the freezing temperature of the water contained in the ambient air, depending on the temperature, the humidity and the pressure of the ambient air, which the heat exchanger of the energy system is subjected to.

In FIG. 2, the dotted lines show the signal exchanges between the control device 70 and the various elements of the system:

- the device 70 receives namely a plurality of temperature and pressure measuring signals coming from the different probes TT, PT, HT, etc., and
- the device sends back instructions to the valves 36, 37, 44, 47, the compressor 42, the circulator 33, etc.

LIST OF PARTS

10 photovoltaic panel
11 hybrid solar panel
12 inverter
20 heat pump (HP)
30 capturing circuit
31 heat exchanger
32 transfer segment
33 circulator
35 reversing means
36 first three-way valve
37 second three-way valve
40 transfer circuit
41 main receiving segment
42 compressor
43 main transfer segment
44 main expansion valve
45 secondary receiving segment
46 secondary transfer segment
47 secondary expansion valve
50 heat-distribution circuit
51 receiving segment
52 domestic hot water tank (ECS)
53 heating floor
54 heating hot water tank (ECC)

I claim:

1. An energy system, comprising:
a power capturing circuit having a power capturing heat transfer fluid and being comprised of a heat exchanger, said heat exchanger having a heat exchanger temperature determined by said power capturing heat transfer fluid;
a power consumption circuit having a power consumption heat transfer fluid;
a means for transferring heat from said heat exchanger to said power consumption circuit, said means for transferring heat being comprised of an intermediate heat transfer fluid and being in a first heat exchange contact with said power capturing circuit and a second heat exchange contact with said power consumption circuit; and a regulator of said heat exchanger temperature between said heat exchanger and said means for transferring heat, wherein said heat exchanger temperature corresponds to a phase change of water in ambient air around said heat exchanger, and wherein said heat exchanger temperature is selected from a group consisting of: a temperature below a temperature corresponding to gas to liquid liquefaction of water vapor contained in said ambient air around said heat exchanger; a temperature below a temperature corresponding to a gas to solid freezing point of water vapor contained in said ambient air around said heat exchanger, and a temperature is below a temperature corresponding to a freezing point of liquid water contained in ambient air around said heat exchanger.

2. The energy system, according to claim 1, wherein power capturing circuit is further comprised of a photovoltaic panel thermally coupled to said heat exchanger, said photovoltaic panel and said heat exchanger forming a hybrid solar panel.

3. The energy system, according to claim 1, wherein said heat exchanger temperature is selected from a group consisting of: a temperature below a temperature corresponding to gas to liquid liquefaction of water vapor contained in said ambient air around said heat exchanger; a temperature below a temperature corresponding to a gas to solid freezing point of water vapor contained in said ambient air around said heat exchanger, a temperature is below a temperature corresponding to a freezing point of liquid water contained in ambient air around said heat exchanger, and a temperature above a temperature corresponding to a solid to liquid melting point of solid water contained in said ambient air around said heat exchanger.

4. The energy system, according to claim 1, wherein said power capturing circuit is further comprised of an energy transfer segment in fluid connection with said heat exchanger, and a circulator in fluid connection with said heat exchanger in series with said energy transfer segment, and wherein said power capturing heat transfer fluid is in heat exchange contact with said intermediate heat transfer fluid of said means for transferring heat at said energy transfer segment.

5. The energy system, according to claim 4, wherein said power capturing circuit is further comprised of a means to limit temperature of said power capturing heat transfer fluid at an inlet of each energy transfer segment.

6. The energy system, according to claim 5, wherein said power capturing circuit is further comprised of a reversing means for direction of said power capturing heat transfer fluid through said power capturing circuit, and wherein said direction corresponds to said heat exchanger being a nighttime state or a daytime state.

7. The energy system, according to claim 6, wherein said means to limit is comprised of a first three-way valve having a first inlet connected to a first end of said heat exchanger, a second inlet connected to a second end of said heat exchanger, and a power capturing circuit outlet connected to an inlet E of said energy transfer segment, and wherein said reversing means is comprised of:
said means to limit; and
a second three-way valve having a power capturing circuit inlet connected to an outlet of said energy transfer segment, a first outlet connected to said first end of said heat exchanger and a second outlet connected to said second end of said heat exchanger.

8. The energy system, according to claim 7, further comprising:
a driving means for said first three way valve and said second three way valve,
wherein said driving means is comprised of a controller in communication with said first three way valve and said second three way valve,
wherein said power capturing circuit has a first configuration with said first outlet of said second three way valve opened, said second outlet of said second three way valve closed, and said second inlet of said first three way valve closed, said first configuration corresponding to limiting temperature of said power capturing heat transfer fluid at said inlet of said energy transfer segment.

9. The energy system, according to claim 8, wherein said power capturing circuit has a second configuration with said first inlet of said first three way valve opened, said second inlet of said first three way valve closed, and said second outlet of said second three way valve opened, said second configuration corresponding to reversing direction of said power capturing heat transfer fluid in said power capturing circuit.

10. The energy system, according to claim 8, wherein said power capturing circuit has a third configuration with said first inlet of said first three way valve closed, said second inlet of said first three way valve opened, and said second outlet of said second three way valve closed, said third configuration corresponding to reversing direction of said power capturing heat transfer fluid in said power capturing circuit.

11. The energy system, according to claim 4, wherein said means for transferring heat from said heat exchanger to said power consumption circuit is further comprised of a heat transfer circuit, said intermediate heat transfer fluid flowing through said heat transfer circuit,
wherein said heat transfer circuit comprises:
a main receiving segment thermally coupled to said energy transfer segment, said main receiving segment and said energy transfer segment forming a main evaporator, said power capturing heat transfer fluid being in said first heat exchange contact with said intermediate heat transfer fluid at said main evaporator;
a compressor in fluid connection with said main receiving segment, having an entry end and an exit end, said intermediate heat transfer fluid being compressed intermediate heat transfer fluid at said exit end;
a main transfer segment being in fluid connection with said exit end of said compressor and having a first main transfer outlet and a second main transfer outlet;
a main expansion valve in fluid connection with said main transfer segment and said main receiving segment, said compressed intermediate heat transfer fluid from said main transfer segment being expanded to said intermediate heat transfer fluid again after said main expansion valve, said intermediate heat transfer fluid again being in fluid connection with said main receiving segment; and a vapor-injecting means in fluid connection between said main transfer segment and said main expansion valve, wherein said first main transfer outlet being in fluid connection with said main expansion valve contains a first part of said compressed intermediate heat transfer fluid, wherein said second main transfer outlet being in fluid connection with said compressor contains a second part of said compressed intermediate heat transfer fluid, and wherein said first part is in heat exchange contact with said second part so as to vaporize said second part to a vaporized fluid, said vaporized fluid being in fluid connection back to said compressor.

12. The energy system, according to claim 11, wherein said vapor-injecting means comprises:

a secondary receiving segment in fluid connection between said first main transfer outlet of said main transfer segment and said main expansion valve;

a secondary expansion valve in fluid connection with said second main transfer outlet of said main transfer segment; and a secondary transfer segment in fluid connection between said secondary expansion valve and said compressor, said secondary transfer segment being thermally coupled to said secondary receiving segment, said secondary transfer segment and said secondary receiving segment forming a second evaporator, said first part being in heat exchange contact with said second part at said second evaporator, wherein said secondary transfer segment has a secondary transfer outlet in fluid connection with an injection inlet of said compressor.

13. The energy system, according to claim 11, further comprising:

a controller in communication with said compressor and said circulator, wherein said compressor has a variable speed determined by said controller, said variable speed corresponding to said heat exchanger temperature, said power capturing heat transfer fluid through said circulator, and said power consumption heat transfer fluid.

14. The energy system, according to claim 11, wherein said power consumption circuit comprises:

a receiving section thermally coupled to said main transfer segment, said receiving section and said main transfer segment forming a condenser, said intermediate heat transfer fluid being in heat exchange contact with said power consumption heat transfer fluid at said condenser; and a heat consuming means in fluid connection with said receiving section.

15. The energy system, according to claim 14, wherein said power consumption circuit comprises:

an additional receiving section thermally coupled to said main transfer segment, said additional receiving section and said main transfer segment forming an additional condenser, said intermediate heat transfer fluid being in heat exchange contact with said power consumption heat transfer fluid at said additional condenser; and an additional heat consuming means in fluid connection with said additional receiving section, said additional heat consuming means being a production circuit with a production fluid and a turbine so as to produce electrical energy from said production fluid through said production circuit.

* * * * *